Figure 6:
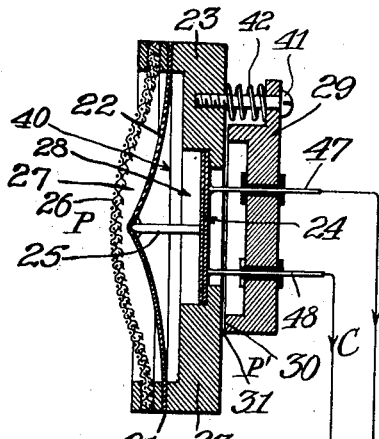

Dec. 22, 1942.  B. B. BAUER  2,305,597
CONVERSION OF WAVE MOTION INTO ELECTRICAL ENERGY
Filed April 7, 1941  6 Sheets-Sheet 1
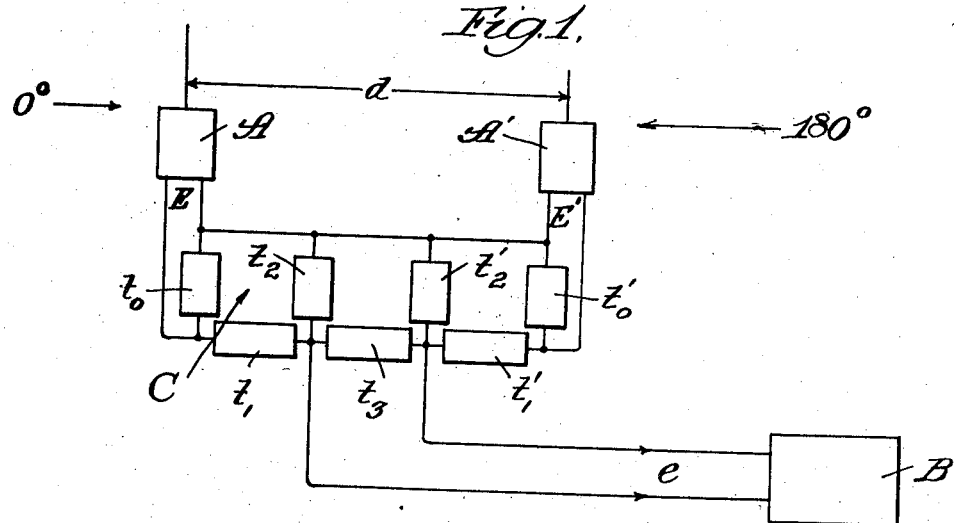
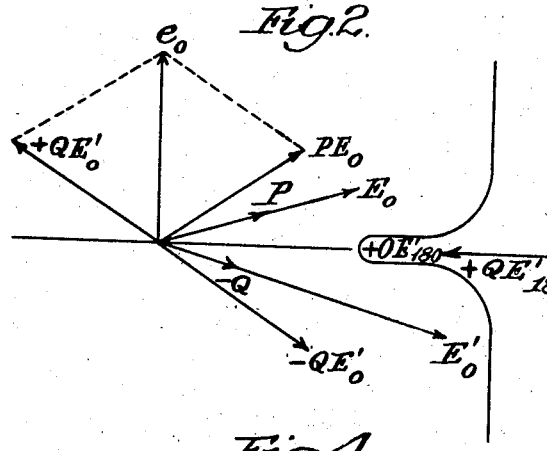
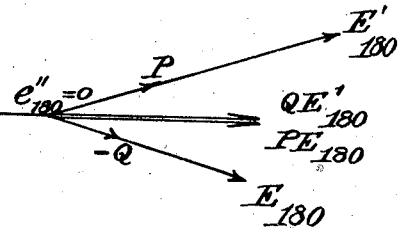
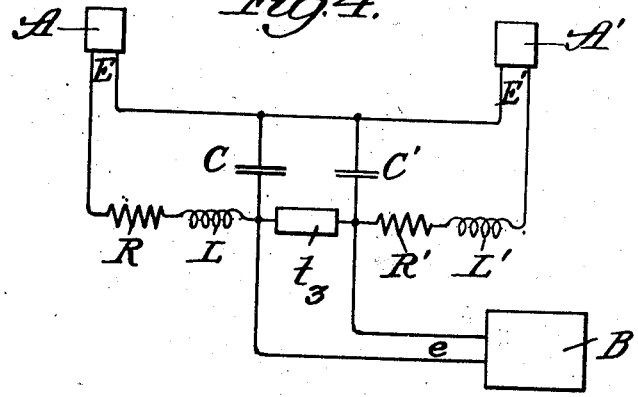
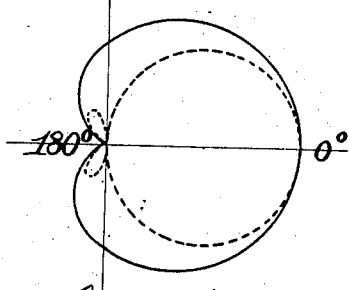
Inventor:
Benjamin B. Bauer
By Dawson, Ooms & Booth
Attorneys.

Dec. 22, 1942.   B. B. BAUER   2,305,597
CONVERSION OF WAVE MOTION INTO ELECTRICAL ENERGY
Filed April 7, 1941   6 Sheets-Sheet 2

Inventor:
Benjamin B. Bauer
By Dawson, Ooms & Booth
Attorneys.

Dec. 22, 1942.  B. B. BAUER  2,305,597
CONVERSION OF WAVE MOTION INTO ELECTRICAL ENERGY
Filed April 7, 1941  6 Sheets-Sheet 3
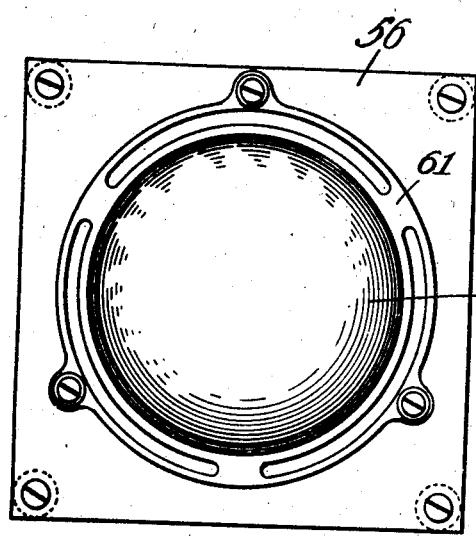
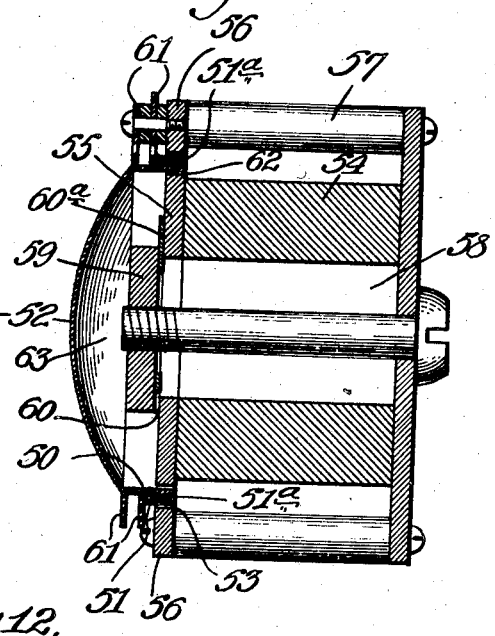
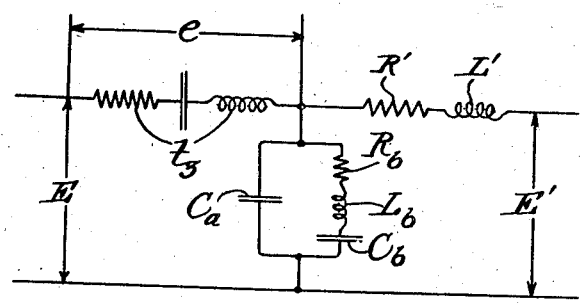
INVENTOR.
Benjamin B. Bauer
BY
Dawson, Ooms & Booth
Attorneys.

Dec. 22, 1942.   B. B. BAUER   2,305,597
CONVERSION OF WAVE MOTION INTO ELECTRICAL ENERGY
Filed April 7, 1941   6 Sheets-Sheet 4
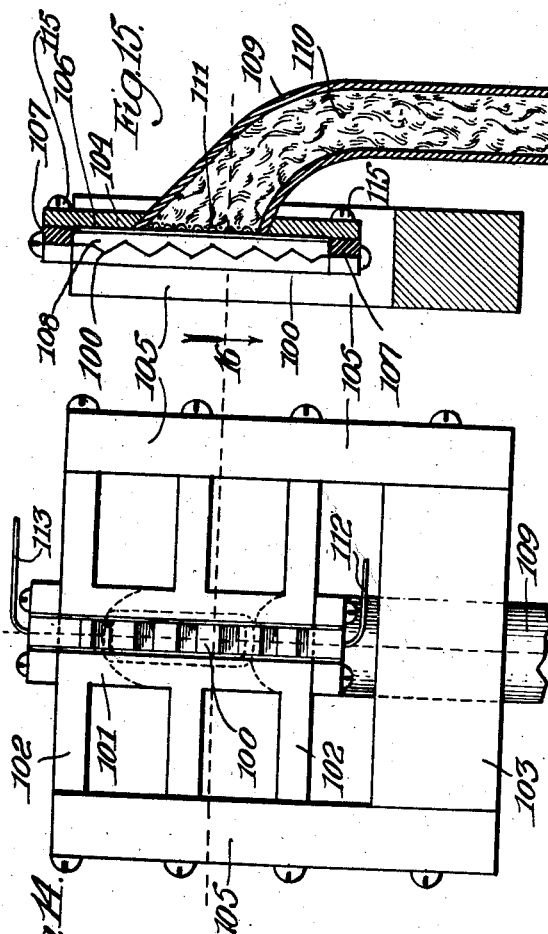
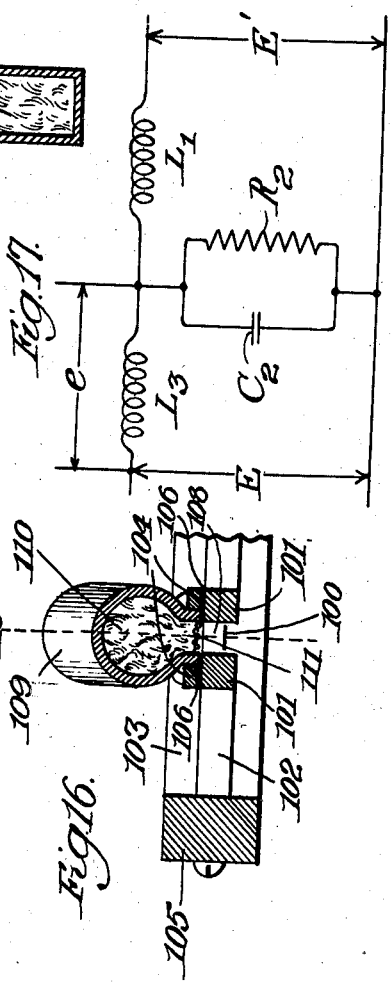
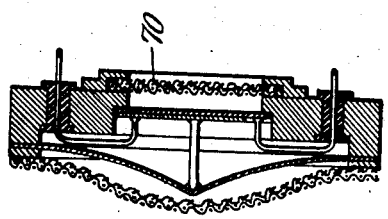
INVENTOR.
BY Benjamin B. Bauer
Dawson, Ooms & Booth
Attorneys.

Dec. 22, 1942. B. B. BAUER 2,305,597
CONVERSION OF WAVE MOTION INTO ELECTRICAL ENERGY
Filed April 7, 1941 6 Sheets-Sheet 5
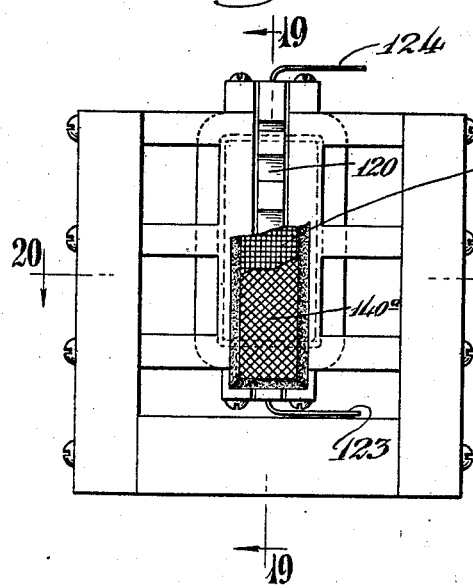
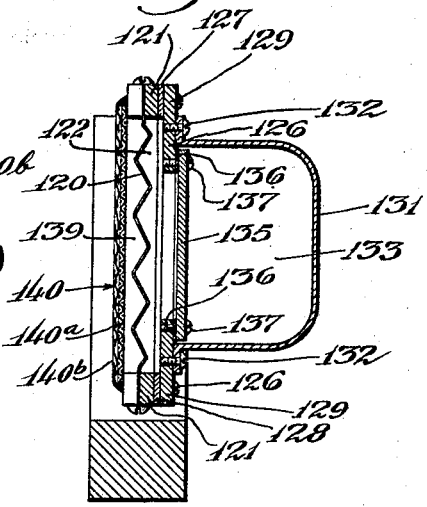
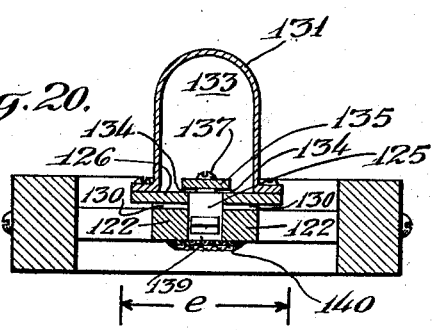
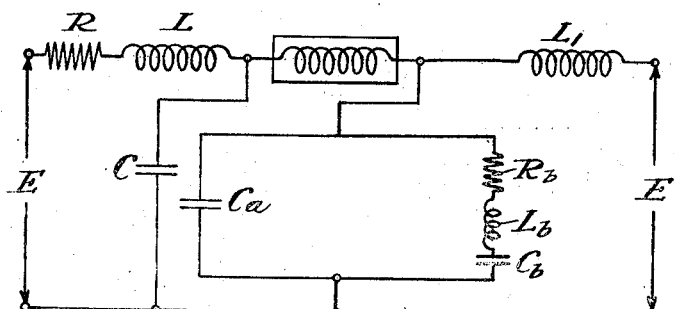
Inventor:
Benjamin B. Bauer
By Dawson, Ooms & Booth
Attorneys.

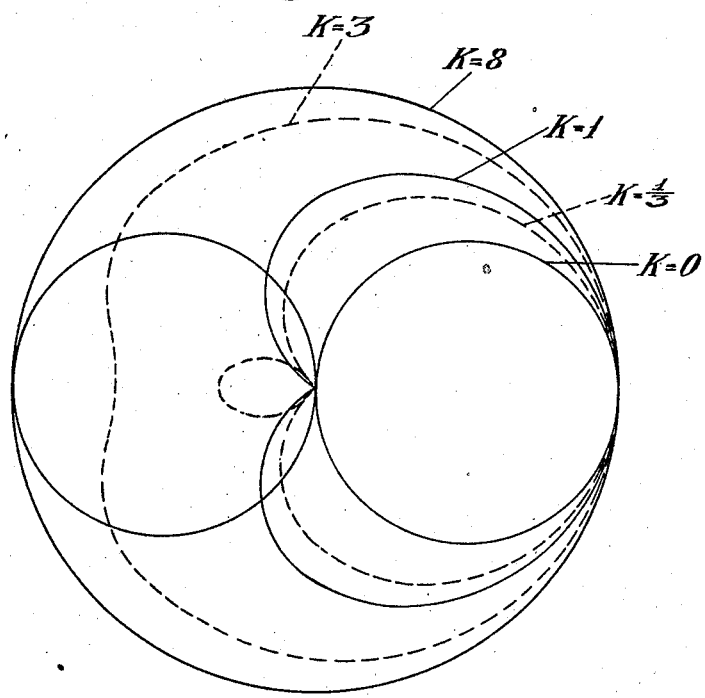

Patented Dec. 22, 1942

2,305,597

UNITED STATES PATENT OFFICE 2,305,597

CONVERSION OF WAVE MOTION INTO ELECTRICAL ENERGY

Benjamin B. Bauer, Chicago, Ill., assignor to S. N. Shure and Frances Shure, trustees, doing business as Shure Brothers, a partnership Application April 7, 1941, Serial No. 387,216

15 Claims. (Cl. 179—1)

This invention relates to apparatus for conversion of wave motion into electrical energy and the converse. More particularly it relates to instruments of unidirectional nature, i. e., in which the instrument is active preferentially in one direction only, throughout an extensive range of frequencies, being relatively inoperative in other directions. This application constitutes a continuation-in-part of my co-pending application, Serial No. 232,439 for "Conversion of wave motion into electrical energy, etc.," now Patent No. 2,237,298. Other copending applications which are also continuations-in-part of Serial No. 232,439 are Serial No. 387,215 entitled "Conversion of wave motion into electrical energy, etc.," filed April 7, 1941; Serial No. 387,217 entitled "Conversion of wave motion into electrical energy, etc.," filed April 7, 1941; and Serial No. 387,438 entitled "Conversion of wave motion into electrical energy, etc.," filed April 8, 1941.

Unidirectional operation has previously been obtained in both the transmitting and receiving transducers through a combination of a unit having a nondirectional (circular) polar sensitivity pattern with one having a bidirectional (cosine-law) polar sensitivity pattern. A combination of two such units causes the resulting polar sensitivity pattern to be unidirectional (cardioid) in shape, and it has been applied extensively in the past to transmitting antennas, microphone apparatus, etc. For this latter application, one of the units is commonly made to operate on the pressure component of the sound wave (pressure transducer) and the other upon the pressure-difference of the sound wave (velocity transducer). Addition or cancellation of the voltages generated in each unit occurs depending upon whether the incidence of sound is from the front (0° incidence) or from the rear (180° incidence) of the instrument. Obviously, the voltages generated by both units for the 180° incidence should be substantially equal and opposite in phase throughout the frequency range in which the cancellation is desired, which because of inherent differences in construction and operating principle is a difficult thing to obtain in microphones operating upon dissimilar components of the sound wave.

One important object of my invention is to provide a unidirectional transducer operating over a wide frequency range and comprising in part two transducing elements operating on the same component of the sound wave, thus doing away with the necessity of subtracting outputs of two transducing elements working on dissimilar components of the sound wave.

Another object is to provide a unidirectional transducer with marked unidirectional properties over the operating range of frequencies.

A further object is to obtain an instrument with unidirectional sensitivity pattern by the action of wave effects at two points in a sound wave, using one transducer element only. Other objects of my invention will become apparent as this specification proceeds.

Figure 7:
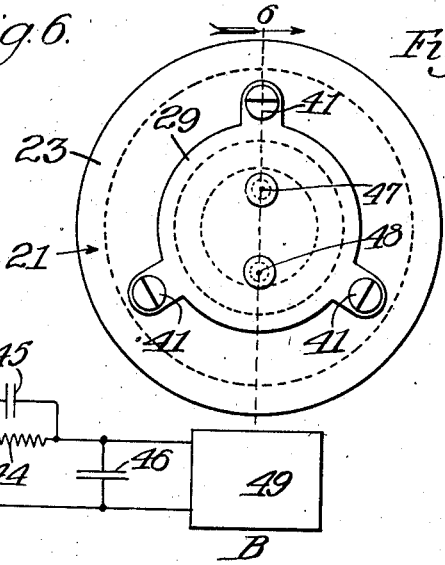
Figure 8:
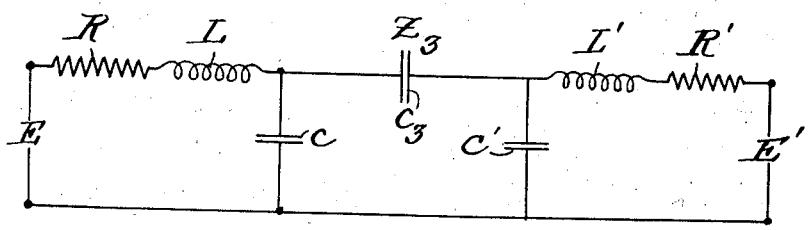
Figure 9:
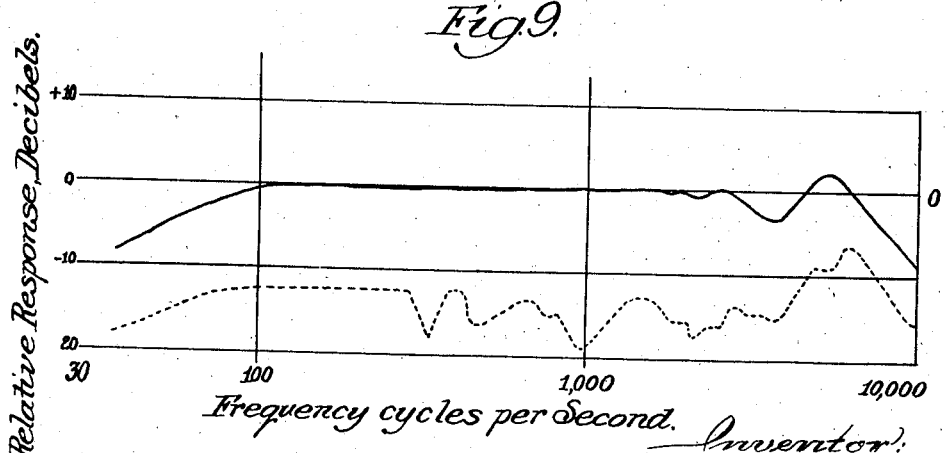

Figure 1 is a diagrammatic layout of generalized apparatus embodying my invention; Fig. 2, a vector diagram showing the voltage relationships for a zero degree incidence of sound; Fig. 3, a similar view to Fig. 2, but representing the 180° incidence of sound; Fig. 4, a diagrammatic view of a specific embodiment comprehended within the diagram of Fig. 1; Fig. 5, a polar diagram illustrating the directional characteristics of the transducer of Fig. 4; Fig. 6, a diagrammatic and sectional view of a unidirectional crystal microphone; Fig. 7, a rear view in elevation of the same; Fig. 8, an equivalent electrical circuit of the microphone shown in Fig. 6; Fig. 9, a frequency response curve of the microphone shown in Fig. 6, the upper curve showing the front side response and the lower dotted line showing the decrease of response for the rear incidence sound; Fig. 10, a part sectional view of a unidirectional dynamic microphone; Fig. 11, a front view of the same; Fig. 12, a diagrammatic view of the equivalent electrical circuit of the microphone shown in Fig. 10; Fig. 13, a cross sectional view of the unidirectional crystal microphone equipped with an acoustical resistance formed of cloth; Fig. 14, a front elevation of a unidirectional moving conductor microphone; Fig. 15, a sectional view, the section being taken as indicated at line 15 of Fig. 14; Fig. 16, a rear elevation of the structure shown in Fig. 14; Fig. 17, a diagrammatic view of the equivalent electrical circuit of the microphone shown in Fig. 14; Fig. 18, a broken front elevation of another modification of the invention; Fig. 19, a sectional view, the section being taken as indicated at line 19 of Fig. 18; Fig. 20, a sectional view, the section being taken as indicated at line 20 of Fig. 18; Fig. 21, a diagrammatic view of the equivalent electrical circuit of the device shown in Figs. 18 to 20; and Fig. 22, a diagrammatic view showing various polar patterns obtained according to the invention.

My invention is principally applicable to production and reception of sound waves in air, although it will become apparent to those skilled in the art that it may be equally applicable to wave phenomena in other media. The transducer element or elements employed may be either of the reversible type, such as piezoelectric crystal, moving coil, moving armature or condenser type, or of the non-reversible type such as, for example, the carbon type. The theory set forth herein is applicable to receiving apparatus, such as loudspeakers, as well as to transmitting apparatus such as microphones.

If transducers of the reversible type are employed, one instrument could serve interchangeably, both as a transmitter and as a receiver.

The nature of my invention is such that it can be best explained by reference to the following equivalent electrical network and circuit equations. Fig. 1 is a schematic representation of two electroacoustic transducers A and A', generating respectively voltages E and E', and the interconnecting electrical network C. The transducers, which may operate on any function of the sound wave whatsoever, are spaced by an effective acoustical distance $d$ which in general should be smaller than, or comparable to, one-quarter wavelength of the highest frequency at which unidirectional action is desired, although it will be shown later that transducers may be constructed having unidirectional properties at frequencies higher than that specified above by virtue of diffraction and other wave effect. C is a generalized network shown in an equivalent $\pi$ section, composed of impedances $Z_0$, $Z_1$, $Z_2$, and $Z_0'$, $Z_1'$, and $Z_2'$. The impedance $Z_3$ is connected to the receiver B which may be an amplifier or any other receiving device. For simplicity, the internal impedances of the transducers A and A' are here considered negligible, although if this is not the case the proper internal impedances should be inserted in the network in carrying out the analysis.

The sound wave is considered as a plane wave which may be incident from any angle $\theta°$ from the normal 0° incidence indicated with the corresponding arrow in Fig. 1. The voltage developed by the transducers A and A' is indicated as E and E' respectively. Subscripts $\theta$, 0 and 180 are used to designate voltages developed from any angle of incidence $\theta°$, for normal front (0°) or for the rear (180°) incidence of sound, respectively. The respective voltages generated by the transducers A and A' will be displaced in phase by an angle given by the equation:

$$\phi = \frac{\omega d}{C_v} \cos \theta \quad \text{(I)}$$

in which $\varphi_\theta$ is the phase angle between the voltages E and E'
$\omega$ is the expression $2\pi f$
$f$ is the frequency, cycles per second
$\theta$ is the angle of incidence of sound
$C_v$ is the velocity of the sound wave Applying circuit analysis to the equivalent circuit of Fig. 1, it may be shown that the voltage $e$ delivered to the receiving apparatus is given by the equation:

$$e = \frac{\left(1+\frac{Z'_1}{Z'_2}\right)E - \left(1+\frac{Z_1}{Z_2}\right)E'}{\frac{Z_1}{Z_3}\left(1+\frac{Z'_1}{Z'_2}\right)+\left(1+\frac{Z_1}{Z_2}\right)\left(1+\frac{Z'_1}{Z'_2}\right)+\frac{Z'_1}{Z_3}\left(1+\frac{Z_1}{Z_2}\right)} \quad \text{(II)}$$

It may be shown, furthermore, that the voltage drop across any branch in a network composed of linear elements, due to the action of two sources A and B connected at any two points, may always be expressed as the sum of the partial voltage drops due to each source acting alone. Thus, for the network of Fig. 1, the portion of $e$ due to E can be expressed as PE where P is the coefficient of E in Equation II divided by the denominator, and the portion of $e$ due to E' can be expressed as QE' where Q is the coefficient of E' in Equation II divided by the denominator.

It is seen therefore that the expression for the voltage delivered to the receiving apparatus can be indicated in the form:

$$e = PE + QE' \quad \text{(III)}$$

Any expression involving network elements, having the function of P and Q in Equation III, is herein called the network factor.

To obtain unidirectional action, the voltage $e_{180}$ should become zero. Therefore, the condition to be met is:

$$e_{180} = PE_{180} + QE'_{180} = 0 \quad \text{(IV)}$$

and hence the relation between coefficients P and Q should be such that:

$$-\frac{P}{Q} = \frac{E'_{180}}{E_{180}} \quad \text{(V)}$$

and the nature of the network components is to be chosen to substantially maintain this relation throughout the frequency range in which the unidirectional action is desired.

Equation V is perfectly general and may be applied to any unidirectional transducing system having two generators and an interconnecting network, delivering the translated energy to a receiver. For the particular case of the network of Fig. 1, the values of network factors P and Q specified above may be inserted into, e. g., (V), giving the following relationship to be fulfilled:

$$\frac{1+\frac{Z'_1}{Z'_2}}{1+\frac{Z_1}{Z_2}} = \frac{E'_{180}}{E_{180}} \quad \text{(VI)}$$

Before describing more specific embodiments of my invention, its operation will be further clarified by the following explanation made in reference to Figs. 2 and 3, which are vector diagrams representing the voltage relations for front and rear incidence of sound upon the instrument of Fig. 1.

For the purpose of explanation, it is assumed that voltages E and E', generated by the similar generators A and A', are of unequal magnitudes, although this is not necessarily the case. The voltage $E_0$ is shown leading the voltage $E'_0$ through an angle $\phi$ determined by Equation I, while the voltage $E_{180}$ is shown lagging behind $E'_{180}$ by the same angle, since reversal of the direction of incidence brings about reversal of the relative phase positions of the generated voltages. The network factors P and −Q are shown of the same relative magnitudes and angular position as the rear (180°) incidence voltages $E'_{180}$ and $E_{180}$ respectively, as specified by Equation V.

The 0° (front-incidence) condition is shown in Fig. 2. The voltage $E_0$ is operated upon the vector P to give the vector $PE_0$ which is the contribution of the generator A to the total output voltage. The voltage $E'_0$ is operated upon by vector −Q giving the vector −$QE_0$ which is the contribution of the generator A' to the total output voltage. $QE'_0$ is added to $PE_0$ giving the resultant output voltage $e_0$.

The (180°) rear incidence condition is shown in Fig. 3. The voltage $E_{180}$ is operated upon by the vector P giving the vector $PE_{180}$ which is the contribution of the generator A to the total output voltage. The voltage $E'_{180}$ is operated upon by the vector −Q giving the vector −$QE'_{180}$ which is the contribution of the generator A' to the total output voltage. It should be noticed that for the rear incidence condition, the voltages $PE_{180}$ and $QE'_{180}$ are out of phase and of equal magnitude, and hence when the latter is added to the former, the resulting total output voltage is zero.

A specific example of network selection will be given in reference to Fig. 4. This network is the same as that of Fig. 1, with the following element values:

$$Z_0 = \infty$$
$$Z'_0 = \infty$$
$$Z_1 = R + j\omega L \qquad (VII)$$
$$Z_2 = \frac{1}{j\omega C}$$
$$Z'_1 = R' + j\omega L'$$
$$Z'_2 = \frac{1}{j\omega C'}$$

It will be assumed here that the voltages $E$ and $E'$ are two vectors of equal magnitude and displaced by an angle $\phi$ whose value is determined from Equation I, their ratio being therefore equal to a unit vector at the angle $\phi$. Substituting this value of angle into the right hand side of Equation VI, and that of the network elements of VII into the left hand side of Equation VI, it is evident that the desired relationship is:

$$\frac{1-\omega^2 L'C' + j\omega C'R'}{1-\omega^2 LC + j\omega CR} = \left|\frac{\omega d}{C_v}\right. \qquad (VIII)$$

The left hand member of the Equation VIII represents a quotient of two vectors, each of which may be made very nearly a vector operating at an angle proportional to frequency, if the relationship between resistance, inductance and capacitance is such that:

$$L = \frac{CR^2}{2} \text{ and } L' = \frac{C'R'^2}{2} \qquad (IX)$$

since substituting these values into Equation IX gives the following relation:

$$\left|\frac{\omega d}{C_v}\right. = \frac{1-\frac{\omega^2 C'^2 R'^2}{2} + j\omega C'R'}{1-\frac{\omega^2 C^2 R^2}{2} + j\omega CR} \qquad (X)$$

It should be observed that the numerator and the denominator of Equation X are the major terms of the expansion for the cosine and the sine functions: hence, as long as:

$$\omega C'R' \ll 1 \text{ and } \omega CR \ll 1 \qquad (XI)$$

The Equation X may be rewritten $$\left|\frac{\omega d}{C_v}\right. = \frac{\cos \omega C'R' + j \sin \omega C'R'}{\cos \omega CR + j \sin \omega CR} = \cos \omega(R'C' - CR) + j \sin \omega(C'R' - CR) = |\omega(C'R' - CR) \qquad (XII)$$

The frequency term $\omega$ drops out of this equation, and therefore the condition for unidirectivity will be obtained if $$\frac{d}{C_v} = R'C' - RC \qquad (XIII)$$

The distance $d$ and the velocity of sound $C_v$ being known, $R$, $R'$, $C$, and $C'$ may be selected by the use of Equation XIII. Then values of $L$ and $L'$ may be computed from Equation IX. Since the Equation XII holds as long as the expressions XI are true, then by choice of sufficiently small distance $d$, unidirectional action may be obtained throughout a wide range of frequencies. I have found that Equation XII is valid up to frequencies at which $d$ is not larger than one-quarter the wavelength of sound; thus, if $d$ is equal to approximately 1.5 cm., unidirectional action is obtained for all frequencies up to approximately 5,000 cycles per second.

The type of polar directivity pattern obtained with the use of my invention depends upon the operational principle of the transducers A and A'. This may be shown by solving the Equation V for $Q$ and substituting into Equation III, which gives:

$$e = P\left(E - \frac{E_{180}}{E'_{180}}E'\right) = PE'\left(\frac{E}{E'} - \frac{E_{180}}{E'_{180}}\right) \qquad (XIV)$$

Since A and A' are similar generators, the ratio of voltages $E$ and $E'$ will be a vector $K$ having constant magnitude and acting at the angle $\phi_0$; therefore, the ratio of $E_{180}$ and $E'_{180}$ will be a vector $K$ at an angle $\phi_{180}$; therefore:

$$e = PE'(K|\phi_0 - K|\phi_{180}) = PE'K(|\phi_0 - |\phi_{180}) \qquad (XV)$$

The expression in parenthesis of Equation XV, at frequencies for which $d$ is small compared to one-quarter wavelength of sound, may be shown to approximately equal the algebraic sum of the angles $\phi_0$ and $\phi_{180}$. Substituting the values of these angles given by Equation I.

$$e = PE'K\frac{\omega d}{C_v}(1 + \cos \theta) \qquad (XVI)$$

If the character of the transducers A and A' is such that the voltage generated is independent of the incidence of sound (pressure-operated or non-directional transducers), the polar characteristic of the combination will be a cardioid of revolution expressed by the quantity in parenthesis in Equation XVI. This polar characteristic is shown graphically in solid line in Fig. 5.

If the voltage $E$ and $E'$ varies as the cosine of the angle of incidence, which will occur if transducers are of the bidirectional or "velocity-type," then $E' = E'_0 \cos \theta$ and:

$$e = PE'_0 K\frac{\omega d}{C_v}[\cos \theta(1 - \cos \theta)] \qquad (XVII)$$

The quantity in brackets of Equation XVI represents the polar characteristic shown graphically in dotted lines in Fig. 5. It is seen, therefore, that combining two velocity-type transducers and the network described results in an electroacoustic transducing instrument of very marked unidirectional properties. It will be observed that my invention may make use of any two transducers operating on the same wave function, even if their transducing principles were dissimilar.

Instead of providing the electrical network directly at the output of the transducers, it is possible to first amplify these outputs with two independent amplifiers and combine the outputs after the amplification. These procedure would be considered of the nature of an equivalent.

Instead of employing two transducers and an electrical network to obtain unidirectional operation, my invention makes such operation possible through modifying wave disturbances at two points in space by means of equivalent acoustical networks and impressing these disturbances upon one electroacoustical transducer. Thus, the transducer is sensitive to one pressure component of a wave emanating from some source in the medium, which component acts through one of such points and is sensitive also to another pressure component of the wave, this latter component acting through the other of such points. An embodiment of my invention employing this alternative is shown in cross section and rear elevation in Figs. 6 and 7. The transducer assembly consists of a diagram 22 suitably supported in a casing 23 which also contains the piezoelectric crystals 24. The forces developed by sound pressure at the diaphragm are transmitted to the crystal by means of a connecting member 25, and the electrical energy developed therein is received from the crystal by means of conductors 47 and 48. The front side of the diaphragm is provided with an acoustical damping screen 26 constituted of a suitable wire-screen support having one or more thicknesses of cloth forming acoustical resistance and inertance. Between the diaphragm 22 and screen 26, there is a cavity 27 having an acoustical compliance C.

The casing 23 has a circular opening 28 which serves as a housing for the piezoelectric crystal and also forms part of the acoustical network. The housing 23, the back plate 29, and the diaphragm 22 provide a cavity 40. At the rear side of the case by means of screws 41 is held a cover 29 provided with ridge 30, the proper spacing being obtained by adjustment against compression of spring 42. Thus, a narrow passage 31 is formed, having acoustical resistance and an inertance. P denotes the sound pressure at the outside of the damping screen; P' denotes the sound pressure at the outside of the passage 31. The effective acoustical path between these pressures is called $d$. I have found that, at frequencies of sound for which the diameter of the casing 23 is smaller than one-half wavelength, the pressures P and P' are essentially equal and separated by a phase angle given by Equation I.

The equivalent electrical circuit of the transducer and its associated acoustical network appears in Fig. 8 in which R and L, and R' and L' are the acoustical resistances and inertances of the screen 26 and the passage 31, respectively; C and C' are acoustical compliances of the cavities 27 and 40 respectively. $Z_3$ is the impedance of the transducer element itself. As a simplifying assumption, the impedance $Z_3$ is considered as formed by the capacitance $C_3$ corresponding to the stiffness of the crystal 24, and the reactions of the medium are neglected. The voltage $e$ developed across $Z_3$ represents the resultant pressure upon the piezoelectric crystal. It may be observed that this equivalent circuit is entirely identical with that of Fig. 4, when the impedance $Z_3$ of Fig. 8 is perfectly general, as in Fig. 4. The complex impedance $Z_3$ in both figures includes the special case of a capacitance $C_3$ as shown explicitly in Fig. 8.

In the commonly used system of electro-acoustic analogies pressure, volume velocity, inertance, acoustic capacitance and resistance are considered the analogues of voltage, current, inductance, capacitance and resistance respectively. This is because these acoustical quantities appear in the analysis of the behavior of acoustical circuits in precisely the way the corresponding electrical quantities appear in the analysis of analogous electrical circuits. The generalized circuit of Fig. 1 may therefore conveniently be used to illustrate the principle of operation of my invention in the special case in which a single transducer is used with acoustic means for modifying wave disturbances at two points in space to obtain unidirectional operation. In this case E and E' represent the effective sound pressures at the input to the two acoustic network branches separated by an effective acoustical distance $d$. In Figure 8 for example, E and E' represent the pressures $p$ and $p'$ of Fig. 6. The generalized network C is then an acoustical one and $Z_3$ is the effective acoustic impedance of the transducer. The voltage $e$ represents the effective pressure on the transducer which results from the combined effects of E and E' altered by acoustical network factors corresponding to P and Q as discussed above. All of the equations previously derived therefore apply to this case when the appropriate acoustic network elements are substituted for the electrical ones.

The acoustic capacitance, resistance and inertance terms are selected in reference to Equations IX and XIII to provide the unidirectional action desired. The terms R, L, and C due to screen 26 and cavity 27 are small compared with terms R', L' and C' due to passage 31 and cavity 40, hence the last term of the right hand side of Equation XIII will not have a great bearing upon the unidirectional action of the microphone. I have found that in some cases it is convenient to leave the damping screen 26 out altogether, and when this is done the constants R' and C' of the Equation XIII have to be readjusted slightly to compensate for disappearance of the last term. I have found that in a microphone with the casing 23 having a diameter of 6 cm. and the cavity 40 having a volume of 8 cc., the effective distance $d'$ is 3.5 cm. and satisfactory operation is obtained when the passage 31 has a circumferential length of 10 cm., a radial length of 0.1 cm. and a thickness of 0.01 cm. These dimensions give an approximate acoustic capacitance C' of $5.7 \times 10^{-6}$ cm.$^5$ per dyne and an approximate acoustic resistance of R' of 18 acoustical ohms. Since C', R' and $d'$ are not calculable with good degree of accuracy in terms of the physical dimensions of the instrument, I prefer to calculate the approximate dimensions for these terms, and obtain the final values by adjusting the thickness of the passage 31 by means of the screw 41 until correct unidirectional action is obtained. Obviously an alternative procedure would be to adjust instead the volume of the cavity 40 or the length of the distance $d$ which could be done by provisions for adjustably altering the size of the case 23.

The adjustment of the thickness of the passage 31 has a marked effect on the directional property of the microphone at low frequencies and therefore the provision of screws 41 to permit variations in this adjustment is desirable. In the specific structure described above a cardioid unidirectional characteristic is obtained with a passage thickness of only 0.01 cm. When this passage is closed the sound wave has access only to the front of the diaphragm and the microphone functions as a conventional pressure operated microphone and is nondirectional at low frequencies.

In the case of a thin passage of the type here employed, the acoustic impedance, $Z_A$, is given approximately by $$Z_A = \frac{12ul}{t^3L} + j\frac{6\rho lu}{5Lt} \qquad \text{(XVIII)}$$

in which $u$ is the viscosity coefficient of the medium
$l$ is the passage length in cms. in the direction of flow
$t$ is the passage thickness in cms.
$L$ is the peripheral length of the passage
$\rho$ is the density of the medium in grams per cubic centimeter, and
$\omega$ is $2\pi$ times the frequency.

From this we note that the acoustic resistance varies inversely as the cube and the inertance inversely as the passage thickness. At low frequencies the reactance of the inertance is small and the phase shift is due almost entirely to R, C, R' and C'.

In Equation XII the left hand side $\omega d/C_v$, represents the phase difference between E and E' which results from the time required for the sound wave to travel the distance $d$. The right hand side $\omega(C'R'-CR)$ represents the difference between the phase shift the pressure experiences in passing through the rear acoustical network to the diaphragm and the phase shift the pressure $p$ experiences in passing through the front acoustical network to the diaphragm. If we define the quantity $k$ as $(C'R'-CR)C_v/d$ that is as the ratio of this difference to the phase difference between E' and E then the resulting response of the microphone, $r$, in polar coordinates, in terms of the angle of sound incidence, $\theta$, is given by $r=p(k-\cos\theta)$ where $p$ is proportional to the maximum pressure of the sound wave. This is the equation of the limaçon. By substituting the values of R' given by Equation XVIII in the expression for $k$ and using this value of $k$ in the equation of the limaçon the variation in directional response with passage thickness may be determined. The response is zero for the values of $\theta$ which make $\cos\theta=-k$. When $k$ equals one, that is when Equation XIII holds, a cardioid directional pattern results. The value of $\cos\theta$ then equals $-1$ when $\theta$ equals 180° and there is no response from the rear of the microphone. This is the directional characteristic usually desired and the one to which I have given detailed consideration above. A plot of some of the other directional characteristics the microphone is capable of giving are shown in Figure 22. As $k$ is made less than one, the microphone maintains its unidirectional property, or preferential response to sound of 0° incidence, but a minor lobe corresponding to diminished response to sound of rear incidence occurs. The two angles of zero response, which may be thought of as being coincident for the special case of $k$ equals one, are symmetrically disposed with respect to 180° in the second and third quadrants. In the limit when $k$ equals zero, that is when R'C' equals RC the null angles are 90° and 270° and the microphone becomes a cosine bidirectional type.

The polar pattern shown in Figure 22 represents the response of the instrument in a plane through the principal axis of the microphone. The surface of revolution generated by rotating the curve about this axis represents the three dimensional response of the device. From this we note that when $k$ equals 1 the response is zero on the principal axis for sound of 180° incidence. As $k$ is reduced the surface in which zero response occurs is a conical one, the internal solid angle of which increases as $k$ is reduced until in the limit when $k$ equals zero the surface becomes the plane of zero response in the resulting cosine bidirectional microphone. As the value of $k$ is made to exceed one, the surface of zero response disappears although the microphone retains its unidirectional property until the limiting value of infinity is reached at which the microphone becomes nondirectional.

Since $d$ depends on the external shape of the microphone, as discussed above, and R and C are determined by the screen 26, and the volume of the cavity 27 respectively, the value of $k$ is most conveniently changed by altering the product R'C'. In the embodiment shown in Figure 6, $k$ is varied by adjusting screws 41 which alter the thickness of the passage 30 and thereby determines R'.

The resistance, R, of the screen, 26, is normally a small fraction of the resistance R', of the passage, 30, so that the sound wave has relatively free access to the front of the diaphragm. All unidirectional characteristics of the microphone between the nondirectional and the cosine bidirectional which are given by the equation for the limaçon are obtained by varying $k$ between zero and infinity. The value of infinity is obtained when the passage is closed. The value of zero is obtained when R'C' equals RC. Since the passage resistance varies inversely as the cube of the passage thickness, this latter adjustment is obtained with a thin passage even with low screen resistance. With a typical screen resistance in a structure of the type shown in Figure 6 a cardioid characteristic is obtained with a passage thickness of 0.01 cm. and a cosine bidirectional characteristic with a passage thickness of the order of 0.03 cm. so that all unidirectional characteristics are obtained by changing the passage thickness from zero to 0.03 cm. Because all of the desired directional properties are obtainable with a very thin passage, 30, if the screen, 26, is properly chosen, the left hand side of Equation VIII may be made proportional to frequency over a relatively wide frequency range even when the passage thickness is altered to give different directional characteristics.

Instead of obtaining resistance R' by means of the passage 31, it is possible to substitute the cover 29 with a suitable foraminous supporting member such as a wire-screen disc having a number of thicknesses of cloth or felt or similar porous material attached to it, completely covering the opening 28, as shown more clearly in Fig. 13. The cloth illustrated is designated by the numeral 70. Fig. 13 is similar to Fig. 6 except as to the use of the cloth screen 70 in place of the narrow passage 31. By a suitable choice of the thickness and porosity of the material employed, the proper value of acoustic impedance may be obtained. Sometimes it is difficult to select a material having the exact ratio of resistance to inertance specified in Equation IX; however, it is seen from Equation X that the squared terms are second-order terms in expansion for cosine function, and therefore the exact relationship between the inertance term L' and the resistance and capacitance terms R' and C' is not a vital one in obtaining the unidirectional operation of the instrument at low frequencies, and reasonable departure therefrom will affect the unidirectional action but slightly. The important adjustment, however, is the one between the terms expressed in Equation XIII.

I have mentioned previously that the Equation XII is valid up to frequencies at which $d$ is not larger than approximately one-quarter wavelength of sound. This corresponds, for the instrument of Fig. 6, to a frequency of approximately 2500 cycles per second. It should not be assumed, however, that above said frequency the unidirectional action ceases, because above 2500 cycles per second, the instrument tends to become highly unidirectional in favor of sounds arriving from the front because of diffraction and the so-called "baffle-effect" due to the size of the case 23. The unidirectional action is therefore obtained essentially throughout all of the important frequency range.

I have found that when a plane wave of constant intensity and varying frequency is impressed upon the front side of the instrument of Fig. 6, the resulting alternating force upon the crystal 24 is approximately proportional to frequency up to the frequency at which one-quarter wavelength equals the effective distance $d$, becoming approximately independent of frequency for frequencies at which one-quarter wavelength is larger than the effective distance $d$. Since the voltage developed in a crystal is proportional to the force applied, I found it useful to provide a compensating electrical network which would deliver an output voltage substantially independent of frequency at the receiving apparatus. This network consists of a parallel combination of a condenser 45 and a resistance 44, both in series with a larger condenser 46; said network is connected across the terminals 47 and 48 of the crystal, the receiver 49 being connected across the larger condenser.

Fig. 9 shows the frequency response obtained with this microphone and electrical network for plane wave incident upon the front (upper curve) and the rear (lower curve) of the instrument, indicating the type of discrimination obtained at all frequencies. The polar directivity pattern is a cardioid shown in solid lines in Fig. 5.

It may be found convenient in many instances to provide the desired electrical compensation in the receiver 49. For applications in which it is desired to give predominance to higher frequencies of sound, the compensating network may be entirely dispensed with.

Another embodiment of my invention is shown in the part sectional elevation in Fig. 10 and front elevation in Fig. 11. A moving coil consisting of a circular bobbin 50 having a winding 51 and a dome-shaped diaphragm or cover 52 is arranged to move in an air gap 53 of a magnetic structure, thereby transforming its mechanical motions into electrical energy which is received from the winding 51 by means of conductors 51ª. The magnetic structure consists of a cylindrical permanent magnet 54 provided at one pole with an internal circular pole piece 55, and having an external pole piece 56 connected to the other pole of the magnet by means of several connecting rods 57 which provide enough cross sectional area to conduct the magnetic flux, and do not appreciably interfere at the same time with the free access of the sound waves to the inner pole shoe 55. Associated with the magnet structure, however not performing flux carrying functions, is a circular plate 59 which defines the cylindrical chamber 58 and also by means of shims 60ª forms a narrow passage 60 which establishes communication between this chamber and the volume within the moving coil.

The coil is suspended on a suitable elastic suspension 61 which permits axial motions in the air gap. The external diameter of the inner pole piece 55 is slightly smaller than the internal diameter of the bobbin, thus forming a narrow passage 62 leading into the cavity 63 which is defined by the moving coil. The stiffness of the suspension 61 is low so that the coil assembly is resonated at a low frequency, preferably in the neighborhood of 60 cycles per second. The resonant effect is not very pronounced, however, because of the damping resulting from motion of air in the passage 62.

The equivalent electrical circuit of the instrument placed in a sound wave is given in Fig. 12. $E$ is the equivalent of sound pressure upon the front of the diaphragm 52. $E'$ is the equivalent of the pressure of the sound wave at the passage 62; $Z_a$ is acoustical impedance of the coil and its suspension; $R'$ and $L'$, the resistance and inertance terms of the passage 62; $C_a$ is the acoustic compliance of the cavity 63; $R_b$ and $L_b$, the acoustic impedance of the passage 60; $C_b$, the acoustical compliance of the chamber 58; as in the preceding embodiment, the reactions of the medium are neglected. The effective acoustical distance between the pressures $E$ and $E'$ will be called $d$, and for frequencies at which this distance is less than a quarter wavelength of sound, $E$ and $E'$ may be considered equal in magnitude and displaced by an angle $\phi$ given in Equation I.

Comparing structures illustrated in Fig. 6 and Fig. 10, it will be noticed that the latter is similar to the former with the screen 26 removed, since the impedance of the narrow passage 31 in Fig. 6 corresponds to that of the passage 62 in Fig. 10, and the compliance of the cavity 40 in Fig. 6 corresponds to the total compliance of the cavities 58 and 63 in Fig. 10. This similarity may be further seen by comparing the equivalent circuits of Fig. 8 and Fig. 12, the former with the impedances R, L, and C (corresponding to the damping screen 26 and cavity 27 in Fig. 6) removed. Comparing these equivalent circuits, the series impedances $R'$ and $L'$ of Fig. 8 correspond with the impedances of the same calling in Fig. 12, and the capacity $C'$ of Fig. 8 corresponds to the total capacity of the condensers $C_a$ and $C_b$ in Fig. 12. Therefore, Equation XIII may be used to determine the correct proportion between the resistance and compliance units in the structure of Fig. 10, the last term of the right hand member of the equation being set equal to zero since the front screen is not used in this embodiment. However, in the moving coil structure of Fig. 10, it is not feasible to make the passage 62 narrow enough to obtain the correct ratio between resistance and inertance as expressed in Equation IX and this would affect adversely the unidirectional properties of the microphone in the middle range of audio frequencies. I have found that by subdividing the compliance elements into two approximately equal parts shown as $C_a$ and $C_b$ interconnected by a series impedance having a resistance value $R_b$ approximately three times the value of $R'$ and an inertance value $L_b$ approximately equal to $L'$, the unidirectivity Equation VI is very closely satisfied throughout substantially all of the audio-frequency range.

I have found that in a microphone as illustrated in Fig. 10 having an external pole piece 56 approximately 3.8 cm. square and a moving coil approximately 2.8 cm. in diameter, the equivalent front-to-back distance $d$ is approximately 2.5 cm. and with a total volume of cavities 58 and 63 of 6 cc. correct operation is obtained if the passage 62 has an axial length of 0.16 cm. and a thickness of 0.007 cm. These dimensions give an approximate acoustic value of $C_a$ and $C_b$ of $2.1 \times 10^{-6}$ cm.$^5$ per dyne each, $R'$ and $R_b$ of 17.3 and 50 acoustical ohms respectively, $L'$ and $L_b$ of .0015 gram per cm.$^4$. These terms are not calculable with high degree of accuracy and minor adjustments are required to obtain satisfactory operation which is similar to that indicated by the performance curves of Fig. 9. It will be understood that through judicious application of previously given theory and equations, the above dimensions may be considerably altered without departing from the scope of my invention.

A still further embodiment of my invention employing a moving conductor as a transducing element is shown in front elevation in Fig. 14.

The voltage generating element is a light metallic conductor or ribbon 100 which may be corrugated to increase its flexibility, supported at its two ends on insulating supporting members 107 and adapted to move between pole pieces 101 of a magnetic structure and convert these motions into electrical energy which is received by means of conductors 112 and 113. The ribbon is almost as wide as the space between the pole pieces, being separated therefrom only enough to move freely therebetween. Figs. 15 and 16 which are cross sectional views of the instrument along the lines 15 and 16 in Fig. 14, respectively, show that the pole pieces 101 and the ribbon 100 form a cavity 108 which is inclosed at the rear by a plate 104 suitably attached to the supporting member 107 by means of screws 115. The cavity 108 is in communication with the exterior by means of passages 106 formed between the pole pieces 101 and the back plate 104, the width of said passages being determined by suitably adjusting the position of the supporting members 107 behind the pole pieces 101. The passages 106 have such proportions as to constitute essentially an acoustical mass element. The cavity 108 is provided with a parallel dissipative element formed by a pipe or conduit 109 of suitable cross section and length fitted at the near end into the back plate 104 and closed at the far end. The conduit is filled with dissipative material 110, such as loosely packed felt, wool, or cotton, which is retained at the near end with a wire screen 111 or similar foraminous retaining member. It will be evident, however, that other suitable means may be used to produce the parallel resistance effect. The sound pressure at the front or exposed part of the ribbon will be called P and that at the entrance of the passage 106 will be called P'. The effective acoustical distance between these pressures will be called $d$.

The equivalent electrical circuit of this microphone is shown in Fig. 17. E and E' represent the sound pressures P and P' respectively, $L_3$ represents the acoustical impedance of the ribbon which is assumed to be a mass, and $e$ is the force developed across the ribbon due to E and E', $L_1$ is the mass of the passage 106, $C_2$ is the compliance of the cavity 108, and $R_2$ is the resistance of the conduit 109.

Equation II may be applied to this circuit by substituting the appropriate value of the impedances. Following a reasoning similar to that employed with Equations IX to XII, it may be shown that unidirectional action is obtained if $$C_2 = \frac{L_1}{2R_2^2} \qquad \text{(XIX)}$$

and, in addition, $$\frac{d}{C_s} = \frac{L_1}{R_2} \ldots \qquad \text{(XX)}$$

I have found that in a microphone of this description having an equivalent front-to-back distance $d$ of 2 cm. satisfactory operation is obtained if the volume of the cavity 106 is 1.2 cm., total length of the slit 106 is 10 cm., its transverse width 0.8 cm., and its thickness 0.06 cm., and the conduit 109 has an approximate cross sectional area of 1.25 sq. cm. and a length of several feet, being filled with loosely packed lambs' wool. This corresponds to the following constants in the equivalent circuit of Fig. 17: capacitance $C_2$, $0.85 \times 10^{-6}$ microfarads; inductance $L_1$, .002 henry; resistance $R_2$, 34 ohms. These constants may be considerably altered within the range of validity of Equations XIX and XX without departing from the spirit of my invention.

Figs. 18, 19, and 20 represent a further embodiment of the invention which is somewhat along the same lines as that shown in Figs. 14 to 17. Here the voltage generating element is a light body or ribbon 120 which is supported at its two ends by the insulating supporting members 121 and is adapted to move between pole pieces 122 of a magnetic structure. The electrical variation generated by ribbon 120 is transmitted by the conductors 123 and 124. As shown more clearly in Fig. 20, the pole pieces 122 form with the ribbon 120 a cavity 125.

The back plate 126 is attached to the supports 121 by means of elastic or compressible spacing washers 127 and 128 and screws 129. This plate forms with the pole pieces 122 passages 130 which communicate at one end with the cavity 125 and at their other end with the atmosphere. The thickness of passages 130 may be adjusted by means of the screws 129 as may be desired, for regulating the polar pattern of the device.

The back plate 126 is widened somewhat to permit the attachment of the shell or inclosure 131 by screws 132. The interior of inclosure 131 defines a cavity 133. Cavity 133 is acoustically connected with cavity 125, and consequently with the body 120 by the passages 134, the thickness of which is controlled by the position of the strip 135. Strip 135 is attached by means of spacers 136 and screws 137. The spacers may be resilient if desired to permit adjustment of the size of passages 134 through adjustment by screws 137.

The cavities 125 and 133, and the passages 134 and 130 form an effective acoustical impedance operative on that part of the sound which gains access to the rear side of the ribbon body 120. The waves having access to the front side of ribbon 120 also are operated upon by an acoustical network in the instant embodiment. This front network, though desirable, is not essential to the functioning of the device. As here shown, the front network comprises a cavity 139 formed by the front side of the ribbon 120 and the pole pieces 122. Also forming a part of the front network is the damping screen 140 formed of a supporting screen 140a and a layer of cloth or foraminous material 140b.

Comparing the embodiment of Figs. 18, 19 and 20 with the embodiment of Figs. 14, 15 and 16, the cavity 125 corresponds with cavity 108 and the combined impedance of passage 134 and cavity 133 corresponds with the combined impedance of screen 111 and filled conduit 109, the impedance of both of these combinations being predominantly resistive over a substantial frequency range. The modification shown in Figs. 14 to 16 has no front acoustical network corresponding with cavity 139 and screen 140 of Figs. 18 to 20, and when only moderate adjustment of unidirectional characteristics is desired the screen 140 may be dispensed with, leaving a network only at the rear of the device.

The equivalent electrical network for this embodiment is given in Fig. 21 where the combined inertance and resistance of the screen 140 is represented by R and L. The acoustic capacitance of the cavity 139 is represented by C. $Z_3$ represents the acoustic impedance of the body 120, and will usually constitute principally inertance.

The acoustical capacitance of the cavity 125 including also the capacitance of passages 134 and 130 is represented by $C_a$ in Fig. 21. The acoustical resistance and inertance of the passage 134 and the acoustical capacitance of the cavity 133 are represented respectively by $R_b$, $L_b$ and $C_b$. If the passage 134 is very thin the impedance of the passage is predominantly resistive at low frequencies. If then the cavity 133 has adequate volume the reactance of $C_b$ may be neglected over an appreciable frequency range so that the principal effect of the combined passages 134 and cavity 133 is resistive.

The inertance of passages 130 is represented on the equivalent electrical diagram by $L_1$. In general the thickness of the passage 130 is such that the resistance is small in comparison with the inertance so that the latter predominates as was true in connection with the corresponding passages 106 of Figs. 14 to 17. For this reason the passages 130 are normally appreciably thicker than passages 30 in Fig. 6 which is designed to be predominantly resistive.

I have found it possible to obtain desirable directional characteristics when the combined area of passages 130 is comparable to the area of the diaphragm 120, and this is true even when diaphragm 120 is moved near the rear plane of the pole pieces 122. Though the volume of cavity 125 is so reduced its effect is retained by the effective volume of the inner ends of the enlarged passages 130.

The specific values of the elements $C_a$, $R_b$, $L_b$, $C_b$, and $L_1$ are chosen to balance the front network formed by R, L and C, so that the sound waves which have access to the rear of the movable element 120 are shifted in phase to a greater extent than the waves having access to the front of the element 120, and so that this difference in the phase shift bears a constant ratio, over an appreciable frequency range, to the phase change across the effective acoustical distance between front and rear of the device. Usually these values are chosen so that the magnitude of the resulting pressure on the rear of the device approximately equals the magnitude of the pressure on the front of the diaphragm.

The approximate relation between $C_a$, $R_b$, $L_1$ and $d$ may be obtained from Equations XIX and XX since these elements correspond to $C_2$, $R_2$, $L_1$ and $d$ before treated.

Adjustment of the directional characteristics is most conveniently obtained by adjusting screws 129 thereby compressing or permitting expansion of spacers 127 and 128. Directional characteristics may also be changed by adjusting screws 137 to narrow or widen the passages 134 although the adjustment first mentioned is in the present structure more convenient. If desired, the structure could be varied to extend strips 135 through an elastic seal in the inclosure 131 to make screws 137 available exteriorly of this inclosure.

While I have shown slots 130 extending both ways toward the outside, this slot or passage might be single and in any desired shape. In general this would involve enlarging the area of the single passage.

While I have shown and described in detail several modifications of my invention, it is recognized that the invention may be practiced in many other embodiments, and the foregoing descriptions and explanations are not to be taken in any limiting sense.

I claim:

1. In a unidirectional electro-acoustic transducer operating in a wave transmitting medium, means having two pressure sensitive surfaces adapted to vibrate and translate its vibrations into electrical energy, one of said surfaces being substantially exposed to the medium, a structure forming a cavity in conjunction with the second of said surfaces, means associated with said cavity defining an acoustical absorptive element having a resistance characteristic, said structure having communicating means defining essentially acoustic inertance between said cavity and the medium, said communicating means being located from said exposed surface at a distance such that the ratio of said distance to the wave velocity in the medium approximately equals the ratio of said inertance to said resistance.

2. In a microphone operating in a medium, a light moving body having pressure-sensitive sides and adapted to move and change its motions into electrical energy, a structure forming a cavity associated with one side of said body, a passage defining essentially acoustic inertance communicating with said cavity and the medium, and absorptive means forming essentially acoustic resistance associated in parallel, in an acoustic sense, to the compliance of said cavity.

3. In a sound translating device, a moving body adapted to vibrate and convert its vibrations into electrical variations, said body being sensitive to sound waves emitted from a sound source in an elastic medium, structure which for waves of normal front incidence adds an equivalent acoustical distance to one pressure component of said waves to which said body is sensitive, and an acoustical network imparting to said component a phase shift bearing a constant ratio to the phase change which takes place due to said waves travelling said distance in said medium throughout a substantial range of frequencies, said network containing one element which is substantially acoustical resistance and another element which is adjustable and which is substantially acoustical inertance.

4. In a sound translating device, a moving body which is sensitive to two components of sound waves emitted from a sound source in an elastic medium, structure separating access of said components to said body by an equivalent acoustical distance, said body being adapted to move in response to said waves and change its motions into electrical variations, and an acoustical network through which one of said components have access to said body and including a resistance acoustically connected to said moving body and an adjustable inertance connecting said resistance to said medium, said network imparting to said one component a phase shift which bears a constant ratio to the phase change taking place when said waves travel said distance over a substantial range of frequencies.

5. In a sound translating device operative in an elastic medium, a light moving body having pressure sensitive areas and adapted to move and change its motions into electrical energy, a structure forming a cavity associated with one of said areas, a passage defining essentially acoustic inertance communicating with said cavity and the medium and a chamber containing dissipative material forming essentially acoustic resistance associated in parallel, in an acoustic sense, to the compliance of said cavity.

6. In a sound translating device operative in an elastic medium, a moving body having pressure sensitive areas and adapted to move and change its motions into electrical energy, and an acoustical network through which sound waves have access to one of said areas and which is effective to shift the phase of waves passing to said one area, said network including a compliance adjacent said body, a resistance in parallel with said compliance, and an inertance connecting said compliance and resistance to the medium.

7. In a sound translating device operative in an elastic medium, a moving body having pressure sensitive areas and adapted to move and change its motions into electrical variations, a cavity adjacent one of said areas and having essentially acoustical compliance, a dissipative chamber communicating with said cavity and having essentially acoustical resistance in parallel with said compliance, and a passage communicating with said cavity and with said medium and having essentially acoustical inertance, said cavity chamber and passage forming an acoustical network effective to shift the phase of the waves to which said one area is sensitive.

8. In a sound translating device operative in an elastic medium, a moving body having pressure sensitive areas and adapted to move and change its motions into electrical variations, a cavity adjacent one of said areas, a chamber and a relatively narrow passage connecting said cavity and said chamber, said chamber and passage representing principally acoustical resistance and a passage connecting said cavity with said medium and representing principally acoustical inertance, said cavity, chamber and passage forming a network effective to shift the phase of waves to which said one area is sensitive.

9. A device as defined in claim 8 in which said relatively narrow passage is adjustable as to width to thus vary the phase shift created by said network.

10. In a sound translating device operative in an elastic medium, a moving body having pressure sensitive areas and adapted to move and change its motions into electrical energy, and an acoustical network through which sound waves have access to one of said areas and which is effective to shift the phase of waves passing to said one area, said network comprising a cavity adjacent said body and representing principally acoustical compliance and a chamber being connected in said network in parallel with said compliance by a passage which with said chamber represents principally acoustical resistance.

11. In a sound translating device operative in an elastic medium, a moving body having pressure sensitive areas and adapted to move and change its motions into electrical energy, acoustical network through which sound waves have access to one of said areas and which is effective to shift the phase of waves passing to said one area, a second acoustical network through which sound waves have access to another of said areas and which is effective to shift the phase of waves passing to said other area, said last-mentioned network comprising a cavity adjacent said body and representing principally acoustical compliance and a chamber connected in said network in parallel with said compliance by a passage which with said chamber represents principally acoustical resistance, the difference in phase shift produced by said networks bearing a constant ratio to the phase change taking place when said waves travel the distance between the entrances to said networks over a substantial range of frequencies.

12. A device as set forth in claim 11 in which said constant ratio is unity.

13. In a sound translating device operative in an elastic medium, a moving body having pressure sensitive areas and adapted to move and change its motions into electrical variations, an acoustical network through which sound waves have access to one of said areas and which is effective to shift the phase of waves passing to said one area, a second acoustical network through which sound waves have access to another of said areas and which is effective to shift the phase of waves passing to said other area, said last-mentioned network comprising a cavity adjacent said body and representing substantially acoustical compliance, a chamber connected in parallel with said compliance by a passage which with said chamber represents principally acoustical resistance, and a passage representing substantially inertance and connecting said cavity to said medium, the difference in phase shift produced by said networks bearing a constant ratio to the phase change taking place when said waves travel the distance between the entrances to said networks over a substantial range of frequencies.

14. A device as set forth in claim 13 in which said first-mentioned network comprises a screen and a cavity bordered on one side by said screen and on another side by said one area.

15. A device as set forth in claim 13 including means for adjusting the width of said passage to vary the inertance of said last-mentioned network and thus alter said constant ratio.

BENJAMIN B. BAUER.

CERTIFICATE OF CORRECTION.

Patent No. 2,305,597.   December 22, 1942.

BENJAMIN B. BAUER.

It is hereby certified that the name of the assignee in the above numbered patent was erroneously described and specified as "S. N. Shure and Frances Shure, Trustees, doing business as Shure Brothers, a partnership" whereas said name should have been described and specified as --S. N. Shure and Frances Shure, Trustee, doing business as Shure Brothers, a partnership--, as shown by the record of assignments in this office; and that the said Letters Patent should be read with this correction therein that the same may conform to the record of the case in the Patent Office.

Signed and sealed this 6th day of July, A. D. 1943.

(Seal)

Henry Van Arsdale,
Acting Commissioner of Patents.